2,980,684

PROCESS FOR DEHYDROGENATING ALKYL PYRIDINES

Jesse T. Dunn and David T. Manning, Charleston, W. Va., assignors to Union Carbide Corporation, a corporation of New York No Drawing. Filed June 2, 1958, Ser. No. 738,989

7 Claims. (Cl. 260—290)

This invention relates to an improvement in a method of dehydrogenating alkyl pyridines to the corresponding alkenyl pyridines, more particularly, it is directed to an improvement in dehydrogenating such ethylpyridines as 2-methyl-5-ethylpyridine for the preparation of such vinyl pyridines as 2-methyl-5-vinyl-pyridine, which is well known as a co-monomer for preparing synthetic fibers and has utility in the tire industry in the preparation of tire-cord latex and tire tread stock.

Several proposals have heretofore been made for subjecting 2-methyl-5-ethylpyridine, referred to hereinafter as MEP, in order to prepare 2-methyl-5-vinylpyridine, hereinafter referred to as MVP. The results have generally left much to be desired. Catalysts that are known to be highly efficient in other dehydrogenations have generally been found to have disappointingly low efficiency, usually less than 50%, in the dehydrogenation of MEP to MVP. In addition, the majority of dehydrogenation catalysts were found to be subject to rapid fouling. This is manifested by decreasing single-pass yields and efficiencies and requires roasting in air for reactivation with consequent interruption of the process.

We have made the surprising discovery that the dehydrogenation of alkyl pyridines to the corresponding alkenyl pyridines, and particularly of MEP to MVP, can be carried out with a heretofore unexcelled combination of efficiency, long catalyst life and ease of reactivation by carrying out the dehydrogenation over an activated calcium oxide catalyst at a temperature within the relatively narrow range of about 660 to 685° C. and maintaining the feed rates of alkyl pyridine vapor and steam over the catalyst at approximately 0.33 to 1.0 and 0.67 to 3.0 LVVH (liquid volumes per volume of catalyst per hour— a most convenient unit of space rate, although the materials whose rates of feed are thus characterized are of course vapors under the conditions of operation), respectively. Calcium oxide catalysts activated with magnesium oxide are outstandingly superior in the dehydrogenation of alkyl pyridines.

One type of catalyst that is desirable in the method of the invention is represented by calcium oxide-magnesium oxide-containing catalysts in which the relative proportions are between about forty-five and ninety-five parts calcium oxide to about fifty-five to five parts magnesium oxide. One preferred catalyst in this category is the calcium-magnesium carbonate mineral dolomite which has been precalcined at about 650° C. to form a layer of the oxides at the surface. Dolomite normally contains about equimolar amounts of the two carbonates. The proportion of either constituent may vary as much as 5% and the material may contain minor impurities that do not appear to have any marked deleterious effect on the efficiency of the catalyst. Calcined dolomitic limestones, which contain from 5 to approximately 40% magnesium carbonate, and calcined marble, which ordinarily contains a small but significant proportion of magnesium carbonate, are slightly less active than calcined dolomite and are charactized by good retention of activity.

Another type of catalyst in the category of useful calcium oxide-magnesium oxide catalysts is that represented by synthetic mixtures of the oxides prepared by precipitation from solutions of their soluble salts, e.g., the nitrates, by addition of potassium or sodium hydroxide or aqueous ammonia followed by ignition at the reaction temperature, e.g., about 660 to 685° C. It is believed that, during the dehydrogenation process, these oxide mixtures react to some extent with carbon dioxide liberated by partial combustion of alkyl and alkenyl pyridines and therefore contain a certain percentage of the corresponding carbonates in equilibrium. The preferred catalyst of this type is an approximately equimolar mixture of the two oxides prepared by precipitation and ignition as described.

The feed rates of alkyl pyridine that have been found to give satisfactory results are within the range of about 0.33 to 1.0 LVVH. The preferred range of feed rates is approximately 0.6 to 0.7 LVVH. The preferred range of steam feed rate is approximately 1.4 to 2.4 LVVH inasmuch as optimum results are obtained within this range. It is to be understood, however, that substantial departures may be made if the resulting disadvantages are not considered too serious. Thus, for example, the steam feed rate may be less than about 1.4 to as low as about 0.67 LVVH if a decrease in efficiency of the order of about 5 to 10% is acceptable. On the other hand, feed rates above about 2.4 LVVH up to about 3.0 LVVH are accompanied by decreases in single-pass yield and by appreciable increases in the cost of the power that is required to vaporize the water.

The dehydrogenation may be carried out in any type of tubular convertor consisting of a material that is capable of resisting temperatures within the range of about 600 to 750° C. High chrome stainless steel is a most convenient material for construction of the reaction chamber but any other catalytically inert material, such as a high silica content glass, is entirely satisfactory. Nickel-containing alloys and nickel steel should however be avoided because they have been found to promote coking.

The optimum temperature for the dehydrogenation in accordance with the method of the invention is within the range of about 660 to 685° C. Operations within this range provide the most desirable combination of high yield, high efficiency and long catalyst life. Departures from this range do not make the method inoperable but are disadvantageous from the standpoint of reducing efficiency and yield, if temperatures substantially below 660° C. are employed. With temperatures in substantial excess of approximately 685° C., the life of the catalyst is appreciably shortened and continued operations are possible only with still higher temperatures due to the fouling of the catalyst.

The method of the invention has a number of most significant advantages. One of these is that the catalysts retain their high activity and efficiency over operating periods of forty-eight hours and longer, and that in most instances the loss in activity is only slight after as long as sixty-five to seventy hours. In addition, the catalysts are restored to full original activity by brief interruptions, of the order of two to three hours, of MEP feed so that steam alone passes over the catalyst at approximately the operating temperatures. This in itself represents a definite economic advantage over catalysts which require more frequent and extensive reactivation. By way of contrast, one of the most successful catalysts now available for dehydrogenation of MEP requires a two to three-hour period of reactivation after each ten to twelve hours of dehydrogenation run, thus consuming from one-sixth to one-third of the total operating time, whereas the catalysts of the present invention require only about three hours of reactivation between each productive cycle of at least fifty hours, or only about one-sixteenth or less of the productive period.

Another important advantage of the method of the invention is that the amount of diluent steam required during the dehydrogenation is appreciably less than required with other catalysts heretofore suggested. One well known catalyst for converting MEP into MVP requires weight ratios of steam to MEP in the range of 4:1 to 10:1 for optimum performance. This corresponds to LVVH values of approximately 4.5 to 17 in contrast to the optimum LVVH values of 1.4 to 2.4 in the method of the invention. The greatly decreased requirement for steam in the method of the invention is reflected in a correspondingly large reduction in electric power required to vaporize the water before dehydrogenation and therefore reduces the power cost appreciably. Following dehydrogenation, the presence of smaller amounts of water in the total crude product simplifies the first refining steps of water removal, thus further reducing the time and power requirements for stripping water from the desired MVP. If attempts are made to operate at lower steam feed rates with such catalysts, the prior art catalysts are found to be inferior not only in their active life, but in dehydrogenation efficiency as well.

These and other advantages will become more apparent from the following detailed description of the examples included to illustrate the best modes now contemplated of practicing the invention.

*Example 1*

A high chrome stainless steel convertor tube reactor 36" x 1½" O.D. was charged with 115 grams (approximately 150 cc.) of a pelleted catalyst of approximately equimolar amounts of calcium oxide and magnesium oxide. The resulting catalyst section, 8¾" in length, was enclosed with 4 x 8 mesh tabular alumina. MEP and water were fed at average rates of 104 and 301 cc. per hour, respectively, to the reactor, the catalyst zone of which was maintained at 660 to 672° C. Temperatures were determined by a Chromel-Alumel thermocouple inserted into a chrome-plated steel thermowell projecting along the axis of the convertor tube to a point one inch below the bottom of the catalyst. The convertor tube was mounted in a vertical position and heated directly by a wire-wound Alundum-core furnace.

The yield and efficiency of MVP from an eleven-hour run were 28.4% and 73.2%, respectively. No loss in catalyst activity occurred over a thirty-four hour period of semicontinuous operation.

Only a slight diminution of catalyst activity occurred after sixty-five hours of semicontinuous operation. The catalyst was restorable to full original activity by treatment with steam for two to three hours at reaction temperature.

*Example 2*

The reactor described in Example 1 was charged with 235 grams (approximately 150 cc.) of 4 x 8 mesh lump dolomite and the dolomite was then calcined by steaming it for three hours at 650° C.

After the precalcining period, MEP and water were fed at average rates of 99 and 323 ml. per hour, respectively, to the reactor, maintaining the catalyst zone at approximately 665 to 680° C. during an eight-hour reaction period. MVP was produced in 27.2% yield and 69.4% efficiency.

A very slight decrease in activity of the catalyst occurred after operating semicontinuously for a fifty-three hour period. Full restoration of catalyst activity was achieved by treatment with steam for three hours at 650° C.

It is to be expected that numerous modifications will readily become apparent to those skilled in the art upon reading this description. All such modifications are intended to be included within the scope of the invention as defined in the appended claims.

We claim:

1. In a method of dehydrogenating an alkyl pyridine for the preparation of the corresponding alkenyl pyridine, the improvement which comprises passing said alkyl pyridine vapor mixed with steam over a catalyst consisting of calcium oxide activated with from five to fifty-five parts of magnesium oxide based on the total weight of catalyst at a temperature within the range of about 660 to 685° C., the feed rates of said pyridine and steam being approximately 0.33 to 1.0 and 0.67 to 3.0 liquid volumes per volume of catalyst per hour, respectively.

2. The method defined in claim 1 wherein the alkyl pyridine is 2-methyl-5-ethylpyridine.

3. The method defined in claim 1 wherein the catalyst contains approximately equimolar amounts of calcium oxide and magnesium oxide.

4. The method defined in claim 1 wherein the catalyst is an approximately equimolar mixture of calcium oxide and magnesium oxide prepared by precipitation of their corresponding soluble salts followed by ignition at about 660 to 685° C.

5. The method defined in claim 1 wherein the catalyst is dolomite calcined at about 650° C.

6. The method defined in claim 1 wherein the feed rate of alkyl pyridine is approximately 0.6 to 0.7 liquid volumes per volume of catalyst per hour.

7. The method defined in claim 1 wherein the feed rate of steam is approximately 1.4 to 2.4 liquid volumes per volume of catalyst per hour.

References Cited in the file of this patent

UNITED STATES PATENTS

| | | |
|---|---|---|
| 2,716,118 | Cislak | Aug. 23, 1955 |
| 2,728,770 | Mahan | Dec. 27, 1955 |
| 2,732,376 | Wagner | Jan. 24, 1956 |
| 2,769,811 | Mahan | Nov. 6, 1956 |

FOREIGN PATENTS

| | | |
|---|---|---|
| 488,593 | Canada | Dec. 2, 1952 |